United States Patent
Seong et al.

(10) Patent No.: US 10,147,927 B2
(45) Date of Patent: Dec. 4, 2018

(54) SECONDARY BATTERY (71) Applicant: SAMSUNG SDI CO., LTD., Yongin-si, Gyeonggi-do (KR)

(72) Inventors: Jaeil Seong, Yongin-si (KR); Hideaki Yoshio, Yongin-si (KR); Jiwon Yun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 322 days.

(21) Appl. No.: 14/097,118

(22) Filed: Dec. 4, 2013

(65) Prior Publication Data

US 2015/0030915 A1 Jan. 29, 2015

(30) Foreign Application Priority Data

Jul. 29, 2013 (KR) .................. 10-2013-0089610

(51) Int. Cl.
*H01M 2/30* (2006.01)
*H01M 2/06* (2006.01)
*H01M 2/04* (2006.01)
*H01M 10/52* (2006.01)

(52) U.S. Cl.
CPC ........... *H01M 2/30* (2013.01); *H01M 2/0473* (2013.01); *H01M 2/0482* (2013.01); *H01M 2/0486* (2013.01); *H01M 2/06* (2013.01); *H01M 10/52* (2013.01); *H01M 2200/00* (2013.01)

(58) Field of Classification Search
CPC .... H01M 2/0456; H01M 2/06; H01M 2/0473; H01M 2/30; H01M 2/0482; H01M 2/0486; H01M 2/00–2/40

See application file for complete search history.

(56) References Cited

U.S. PATENT DOCUMENTS

| | | | |
|---|---|---|---|
| 8,557,433 B2 * | 10/2013 | Kim | H01M 2/0404 429/163 |
| 9,203,074 B2 * | 12/2015 | Seong | H01M 2/0404 |
| 9,570,731 B2 * | 2/2017 | Seong | H01M 2/06 |
| 2006/0099490 A1 * | 5/2006 | Cho | H01M 2/0207 429/53 |
| 2007/0007141 A1 | 1/2007 | Maeda et al. | |
| 2007/0154782 A1 * | 7/2007 | Cho | H01M 2/0207 429/56 |

(Continued)

FOREIGN PATENT DOCUMENTS

| | | |
|---|---|---|
| JP | 2007-042598 A | 2/2007 |
| JP | 2009-259651 A | 11/2009 |
| KR | 2001-0105524 A | 11/2001 |

*Primary Examiner* — Milton I Cano
*Assistant Examiner* — Jennifer A Moss
(74) *Attorney, Agent, or Firm* — Lewis Roca Rothgerber Christie LLP (57) ABSTRACT

A secondary battery including: an electrode assembly; a case accommodating the electrode assembly; a cap assembly including a cap plate coupled to the case, and a bottom plate attached to a bottom surface of the cap plate; and an electrode terminal protruding from the cap assembly and electrically connected to the electrode assembly, and the bottom plate includes a terminal plate electrically connected to the electrode terminal, and an insulation film stacked on the terminal plate and electrically insulating the terminal plate and the cap plate from each other, the insulation film being integrally formed with the terminal plate.

10 Claims, 5 Drawing Sheets

(56) References Cited

U.S. PATENT DOCUMENTS

| | | | |
|---|---|---|---|
| 2009/0109099 A1* | 4/2009 | Jang | H01Q 1/2225 343/702 |
| 2010/0143789 A1* | 6/2010 | Kim | H01M 2/0404 429/163 |
| 2011/0039136 A1* | 2/2011 | Byun | H01M 2/0404 429/56 |
| 2011/0052949 A1* | 3/2011 | Byun | H01M 2/043 429/61 |

* cited by examiner

SECONDARY BATTERY

CROSS-REFERENCE TO RELATED APPLICATION

This application claims priority to and the benefit of Korean Patent Application No. 10-2013-0089610, filed on Jul. 29, 2013 in the Korean Intellectual Property Office, the entire content of which is incorporated herein by reference.

BACKGROUND

1. Field

Aspects of embodiments of the present invention relate to a secondary battery.

2. Description of the Related Art

Secondary batteries are rechargeable, unlike primary batteries which are not. Types of secondary batteries include a low-capacity battery including a battery cell in the form of a pack and typically used for small portable electronic devices such as cellular phones and camcorders, and a high-capacity battery including dozens of battery cells connected to one another and typically used as a motor-driving power source, such as for hybrid vehicles, electric vehicles, or electric scooters.

A secondary battery may include an electrode assembly, a case accommodating the electrode assembly, and a cap plate coupled to a top portion of the case.

SUMMARY

According to an aspect of embodiments of the present invention, a secondary battery has a reduced number of components, a simplified assembling process, and a reduced cost by integrating a terminal plate and an insulation film.

According to one or more embodiments of the present invention, a secondary battery includes: an electrode assembly; a case accommodating the electrode assembly; a cap assembly including a cap plate coupled to the case, and a bottom plate attached to a bottom surface of the cap plate; and an electrode terminal protruding from the cap assembly and electrically connected to the electrode assembly, and the bottom plate includes a terminal plate electrically connected to the electrode terminal, and an insulation film stacked on the terminal plate and electrically insulating the terminal plate and the cap plate from each other, the insulation film being integrally formed with the terminal plate.

The bottom plate may include a terminal through hole, and the electrode terminal may pass through the terminal through hole.

The insulation film may be between the cap plate and the terminal plate.

The insulation film may cover top and lateral surfaces of the terminal plate.

The terminal plate may include a concave portion formed in the lateral surface.

The insulation film may include a concave portion corresponding to the concave portion of the terminal plate.

The concave portion of the terminal plate may be exposed through the insulation film.

The cap plate may include a protrusion at the bottom surface and spaced apart from the concave portion, the protrusion being configured to contact the concave portion during longitudinal compression of the secondary battery to short circuit the secondary battery.

The insulation film may have a same thickness on the top and lateral surfaces of the terminal plate.

The terminal plate may include at least one cut-away region, and the cut-away region may be exposed through the insulation film.

The insulation film may have a same surface roughness throughout an entire surface thereof.

The terminal plate and the insulation film may be laminated together.

The terminal plate may include a material selected from the group consisting of Invar, copper (Cu), aluminum (Al), and nickel (Ni).

The insulation film may include a material selected from the group consisting of polyethylene (PE), polypropylene (PP), polyimide (PI), polyethylene terephthalate (PET), and polycarbonate (PC).

As described above, according to embodiments of the present invention, a secondary battery has a reduced number of components, a simplified assembling process, and a reduced cost by integrating a terminal plate and an insulation film.

BRIEF DESCRIPTION OF THE DRAWINGS

The accompanying drawings are included to provide a further understanding of embodiments of the present invention, and are incorporated in and constitute a part of this specification. The drawings illustrate some exemplary embodiments of the present invention and, together with the description, serve to explain aspects and principles of embodiments of the present invention.

DETAILED DESCRIPTION

Hereinafter, some exemplary embodiments are described in further detail with reference to the accompanying drawings.

Some exemplary embodiments of the present invention are described more fully hereinafter with reference to the accompanying drawings; however, embodiments of the present invention may be embodied in different forms and should not be construed as limited to the embodiments set forth herein. As those skilled in the art would realize, the described embodiments may be modified in various different ways, all without departing from the spirit or scope of the present invention. Accordingly, the drawings and description are to be regarded as illustrative in nature and not restrictive.

In the drawings, thicknesses of layers and regions may be exaggerated for clarity. Like numbers refer to like elements throughout. As used herein, the term "and/or" includes any and all combinations of one or more of the associated listed items.

The terminology used herein is for the purpose of describing particular embodiments and is not intended to be limiting of the invention. As used herein, singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," etc. may be used herein to describe various members, elements, regions, layers, and/or parts, these members, elements, regions, layers, and/or parts should not be limited by these terms. These terms are merely used to distinguish one member, element, region, layer, and/or part from another member, element, region, layer, and/or part. Thus, for example, a first member, element, region, layer, and/or part discussed below could be termed a second member, element, region, layer, and/or part without departing from the teachings of the present invention.

Figure 1:
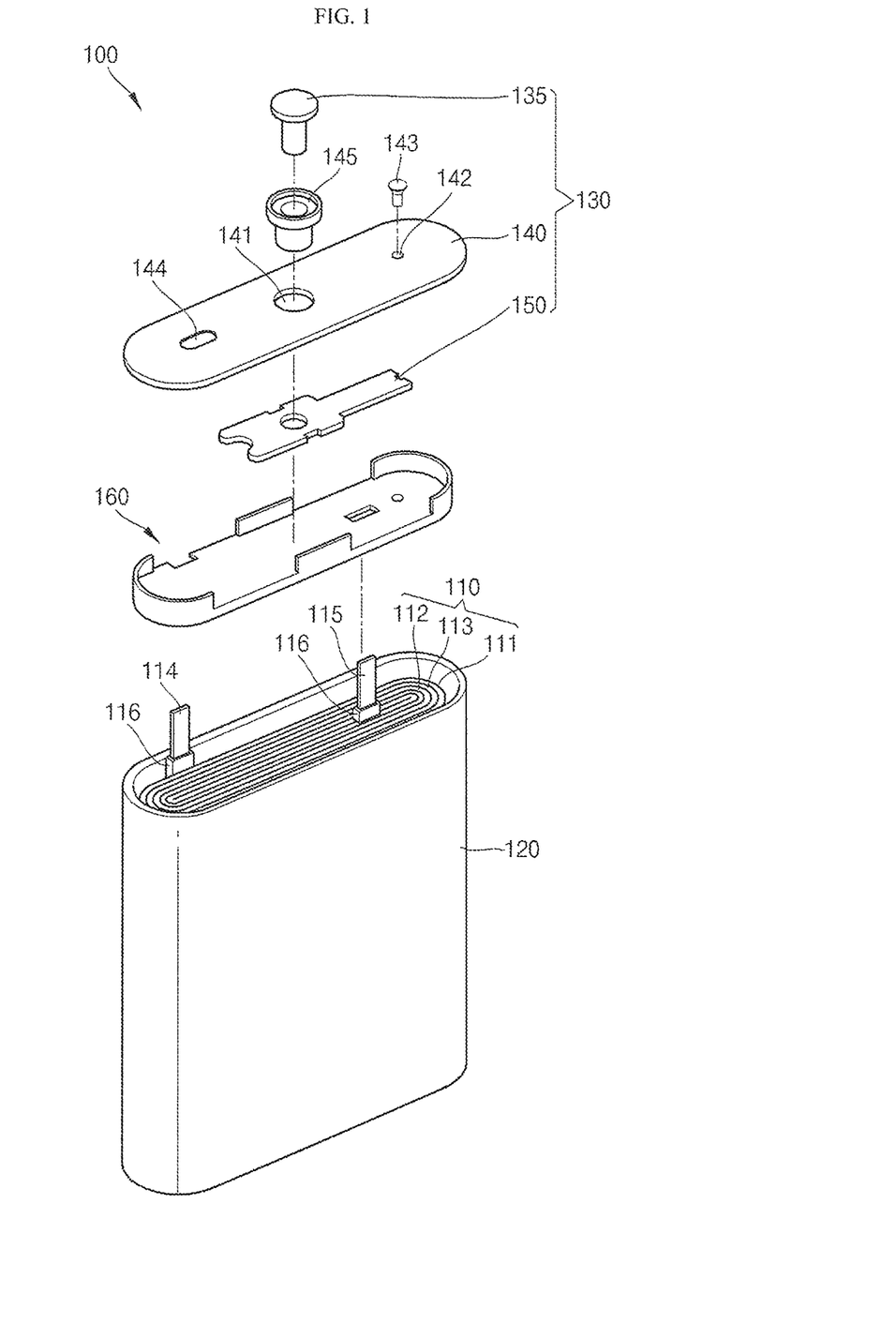
FIG. 1 is an exploded perspective view of a secondary battery, according to an embodiment of the present invention.

FIG. 1 is an exploded perspective view of a secondary battery, according to an embodiment of the present invention.

Referring to FIG. 1, a secondary battery 100 according to an embodiment of the present invention includes an electrode assembly 110 including a first electrode plate 111, a second electrode plate 112, and a separator 113, a case 120 accommodating the electrode assembly 110 with an electrolytic solution, and a cap assembly 130 sealing a top portion of the case 120. In one embodiment, the secondary battery 100 may further include an insulation case 160 installed between the electrode assembly 110 and the cap assembly 130.

The electrode assembly 110 may be formed by winding or laminating a stacked structure including a first electrode plate 111, a second electrode plate 112, and a separator 113, which are shaped of a thin plate or a thin foil. In addition, the electrode assembly 110 may include electrode tabs, that is, a first electrode tab 114 and a second electrode tab 115.

The first electrode plate 111, in one embodiment, may include a first electrode collector made of an aluminum foil, and a first electrode active material formed on the first electrode collector. Lithium cobaltate may be used as the first electrode active material.

The second electrode plate 112, in one embodiment, may include a second electrode collector made of a copper foil, and a second electrode active material formed on the second electrode collector. Carbon may be used as the second electrode active material.

The first electrode plate 111 may function as a positive electrode, and the second electrode plate 112 may function as a negative electrode. The first electrode plate 111 and the second electrode plate 112 may have different polarities.

The separator 113 may include, but is not limited to, polyethylene, polypropylene, or a co-polymer of polyethylene and polypropylene. The separator 113, in one embodiment, is formed such that it has a width greater than that of the first electrode plate 111 or the second electrode plate 112 to prevent or substantially prevent a short circuit from occurring between the first and second electrode plates 111 and 112.

The first electrode tab 114 and the second electrode tab 115, in one embodiment, are drawn from the first electrode plate 111 and the second electrode plate 112, respectively. In one embodiment, in order to prevent or substantially prevent a short circuit between the first and second electrode plates 111 and 112, an insulation tape 116 is wound around boundary portions of the first electrode tab 114 and the second electrode tab 115 drawn to the outside of the electrode assembly 110.

The case 120, in one embodiment, may be a can made of a metallic material and may be formed by deep drawing. The case 120 may be formed using a lightweight, conductive material, such as aluminum or an aluminum alloy and may serve as an electrode itself. In one embodiment of the present invention, the case 120 may serve as a positive electrode. The case 120 is a receiving container for accommodating the electrode assembly 110 and an electrolytic solution. A top-end opening of the case 120, through which the electrode assembly 110 is inserted to the inside of the case 120, is sealed by the cap assembly 130.

The cap assembly 130, in one embodiment, may include a cap plate 140, a plug 143, a safety vent 144, and an electrode terminal 135.

The cap plate 140 may be formed of a metal plate sized and shaped to fit the top-end opening of the case 120. The cap plate 140 is coupled to the case 120 by, for example, welding, and may serve as the same electrode as the case 120, that is, in one embodiment, a positive electrode. A terminal hole 141 may be formed at the center of the cap plate 140. An electrolyte injection hole 142 may be formed at a side of the cap plate 140.

The plug 143 is provided to seal the electrolyte injection hole 142 after the electrolytic solution is injected into the case 120 through the electrolyte injection hole 142. The plug 143, in one embodiment, may be generally formed of a ball-type preform made of aluminum or an aluminum-containing metal. The plug 143, in one embodiment, is mechanically press-fit inserted into the electrolyte injection hole 142 to be coupled to the cap plate 140 at the electrolyte injection hole 142.

The safety vent 144, in one embodiment, may be formed at the other side of the cap plate 140 and is operated to secure safety of the secondary battery 100 by releasing an internal gas when the internal pressure of the secondary battery 100 exceeds a reference pressure, such as due to overcharge, etc. The safety vent 144, in one embodiment, is formed to be thinner than other parts of the cap plate 140 and may be formed as a groove. When the internal pressure of the secondary battery 100 exceeds the reference pressure, the safety vent 144 is ruptured earlier than the other parts of the cap plate 140 to release the internal gas.

The electrode terminal 135 passes through the cap plate 140 through the terminal hole 141. In one embodiment, a top portion of the electrode terminal 135 upwardly protrudes from the cap plate 140.

In one embodiment, a tubular gasket 145 is installed on the outer surface of the electrode terminal 135 to insulate the electrode terminal 135 and the cap plate 140 from each other. A bottom plate 150 including a terminal plate 151 and an insulation film 152 stacked on the terminal plate 151 and integrated with the terminal plate 151 is arranged on a bottom surface of the cap plate 140. A bottom portion of the electrode terminal 135 is electrically connected to the terminal plate 151 of the bottom plate 150, and the terminal plate 151 is electrically insulated from the cap plate 140 by the insulation film 152.

In one embodiment, the electrode terminal 135 is electrically connected to the second electrode plate 112 of the electrode assembly 110 through the second electrode tab 115 of the electrode assembly 110, and the first electrode plate 111 of the electrode assembly 110 is electrically connected to the cap plate 140 through the first electrode tab 114.

In one embodiment, the insulation case 160 is installed between the electrode assembly 110 and the cap assembly 130. The insulation case 160 may prevent or substantially prevent an electrical short circuit between the electrode assembly 110 and the cap assembly 130 and support and fix the first electrode tab 114 and the second electrode tab 115. The insulation case 140 is made of an insulating material.

A configuration of a lower portion of the cap plate 140 of the secondary battery 100 according to an embodiment of the present invention is described below in further detail.

Figure 2:
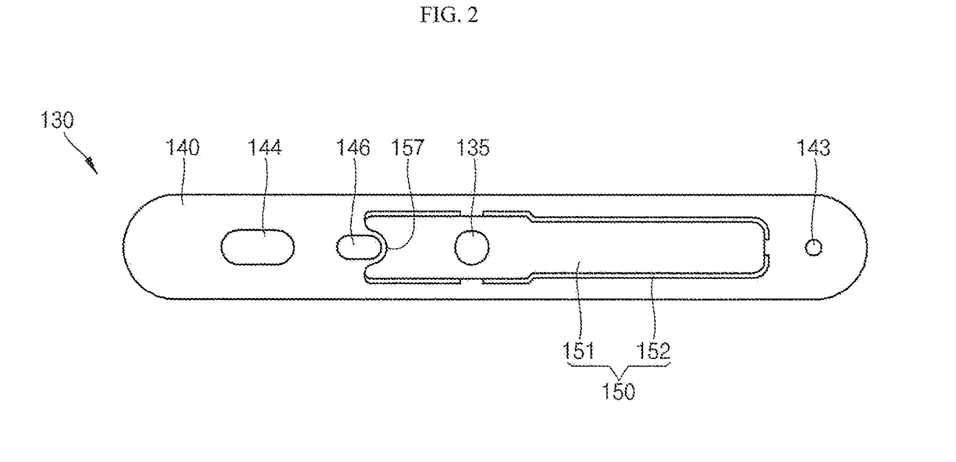
FIG. 2 is a plan view illustrating a bottom surface of a cap assembly of the secondary battery of FIG. 1.
Figure 3:
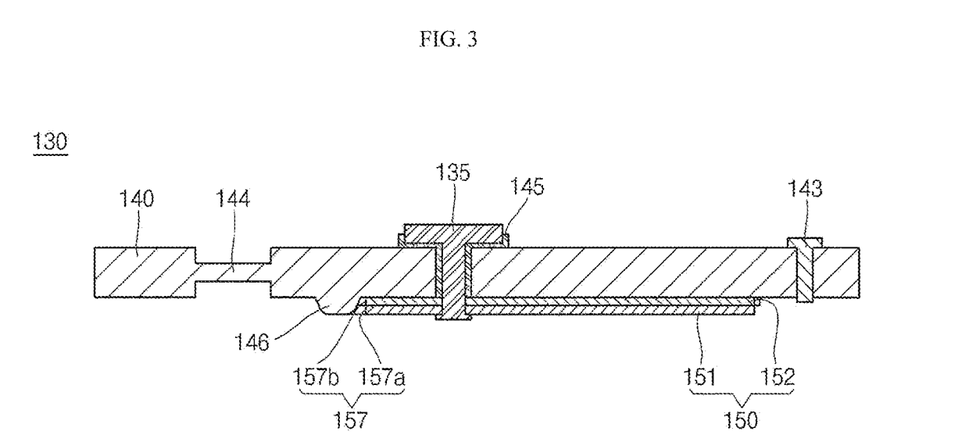
FIG. 3 is a cross-sectional view of the cap assembly shown in FIG. 2.

FIG. 2 is a plan view illustrating a bottom surface of the cap assembly 130; and FIG. 3 is a cross-sectional view of the cap assembly 130.

Referring to FIGS. 2 and 3, the cap assembly 130 according to an embodiment of the present invention may further include a protrusion 146 formed at a side of a lower portion of the cap plate 140 to cause a short circuit. The bottom plate 150 is installed to be spaced apart (e.g. spaced apart by a predetermined distance) from the protrusion 146. A configuration of the lower portion of the cap plate 140 according to an embodiment of the present invention is described further below with reference to FIGS. 2 and 3 together with FIG. 1.

The protrusion 146, in one embodiment, is made of the same material as the cap plate 140 and is electrically connected to the first electrode plate 111. When the protrusion 146, which is spaced apart from the bottom plate 150, makes contact with the terminal plate 151 of the bottom plate 150 when a longitudinally compressive force is externally applied to the secondary battery 100, a short circuit of the secondary battery 100 is caused. For example, when the secondary battery 100 is compressed or damaged due to a longitudinal compression test or external shock, such as by a user of the secondary battery 100, the protrusion 146 and the terminal plate 151 are brought into contact with each other before a short circuit occurs between different active material layers or to the electrode assembly 110 or the active material layers, thereby consuming power. That is, even if a short circuit occurs between electrode collectors or active material layers having different polarities in the electrode assembly 110, the protrusion 146 and the terminal plate 151 may also be subjected to the short circuit. Therefore, the power that is internally consumed by the electrode assembly 110 is divided and consumed by contact portions of the protrusion 146 and the terminal plate 151, thereby reducing a probability of fire or explosion of the secondary battery 100.

The bottom plate 150 includes the terminal plate 151, and the insulation film 152 stacked on the terminal plate 151 and integrated with the terminal plate 151 to electrically insulate the terminal plate 151 and the cap plate 140 from each other. In one embodiment, the insulation film 152 may be formed of a thin plate or layer, but embodiments of the present invention are not limited thereto.

A terminal through hole 155 (see FIG. 4A) corresponding to the terminal hole 141 of the cap plate 140 is formed in the bottom plate 150, and the electrode terminal 135 passes through the terminal through hole 155. Thus, the terminal plate 151 and the electrode terminal 135 are electrically connected to each other. In one embodiment, the terminal plate 151 is electrically connected to the second electrode plate 112 of the electrode assembly 110 by the second electrode tab 115, and the electrode terminal 135 is electrically connected to the second electrode plate 112 of the electrode assembly 110 by the terminal plate 151 and the second electrode tab 115.

The insulation film 152 is interposed between the terminal plate 151 and the cap plate 140. Therefore, the terminal plate 151 is electrically insulated from the cap plate 140 by the insulation film 152. In one embodiment, the insulation film 152 is bent from a top surface to a lateral surface of the terminal plate 151 and covers the lateral surface of the terminal plate 151, thereby preventing or substantially preventing the terminal plate 151 from making contact with the case 120 or the first electrode tab 114 having a different polarity from the terminal plate 151.

In one embodiment, a concave portion 157 is formed on a lateral surface of the bottom plate 150 to allow the bottom plate 150 to easily contact the protrusion 146 when a longitudinal compressive force is externally applied to the secondary battery 100. In one embodiment, a concave portion 157a is formed on a lateral surface of the terminal plate 151 to allow the terminal plate 151 to easily contact the protrusion 146, and a concave portion 157b having a same curved shape and size as the concave portion 157a of the terminal plate 151 is formed on the insulation film 152 so as to correspond to the concave portion 157a of the terminal plate 151. In order to allow a short circuit to be caused between the terminal plate 151 and the protrusion 146, the concave portion 157a of the terminal plate 151 is exposed by the insulation film 152. That is, the insulation film 152 is formed so as not to cover the concave portion 157a of the terminal plate 151.

Therefore, when the secondary battery 100 is deformed due to a longitudinal compressive force, the protrusion 146 and the concave portion 157a of the terminal plate 151 may be easily brought into contact with each other, thereby causing the short circuit between the terminal plate 151 and the protrusion 146.

The terminal plate 151, in one embodiment, may be made of a material selected from the group consisting of Invar, copper (Cu), aluminum (Al), nickel (Ni), and equivalents thereof, but embodiments of the present invention are not limited thereto. In addition, the insulation film 152 may be made of a material selected from the group consisting of polypropylene (PP), polyethylene (PE), polyimide (PI), polyethylene terephthalate (PET), polycarbonate (PC), and equivalents thereof, but embodiments of the present invention are not limited thereto.

The bottom plate 150 of the secondary battery 100 according to an embodiment of the present invention, and a manufacturing method thereof, are described further below with reference to the accompanying drawings.

Figure 4A:
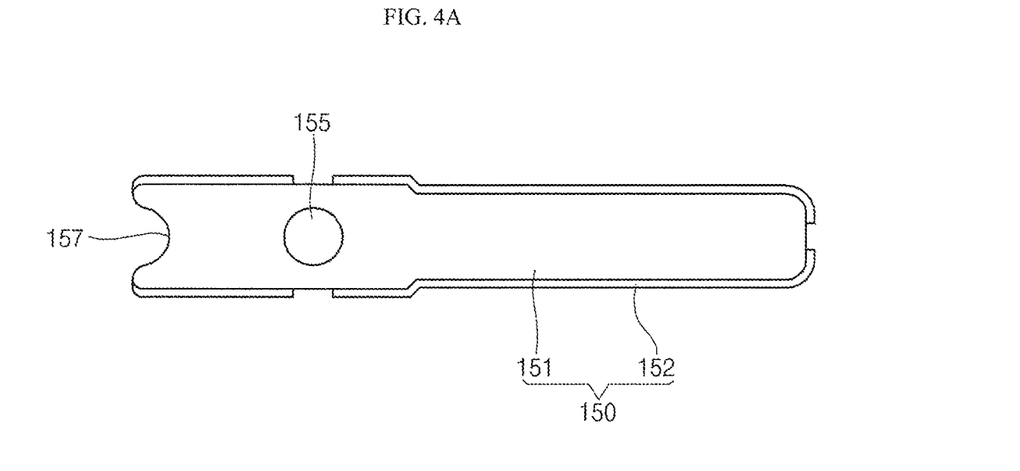
FIG. 4A is a plan view illustrating a bottom surface of a bottom plate of the secondary battery of FIG. 1, according to an embodiment of the present invention.
Figure 4B:
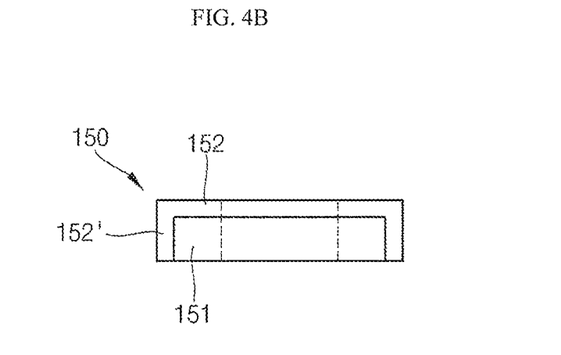
FIG. 4B is a front view of the bottom plate shown in FIG. 4A.
Figure 4C:
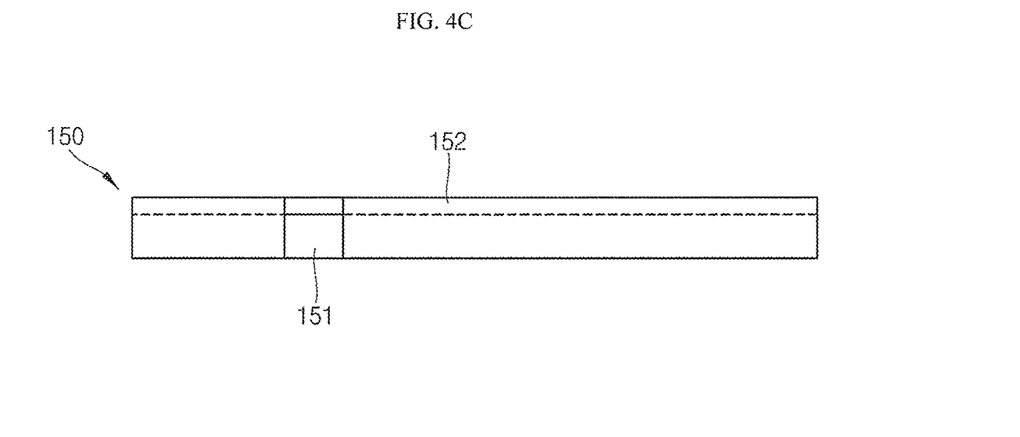
FIG. 4C is a side view of the bottom plate shown in FIG. 4A.
Figure 5:
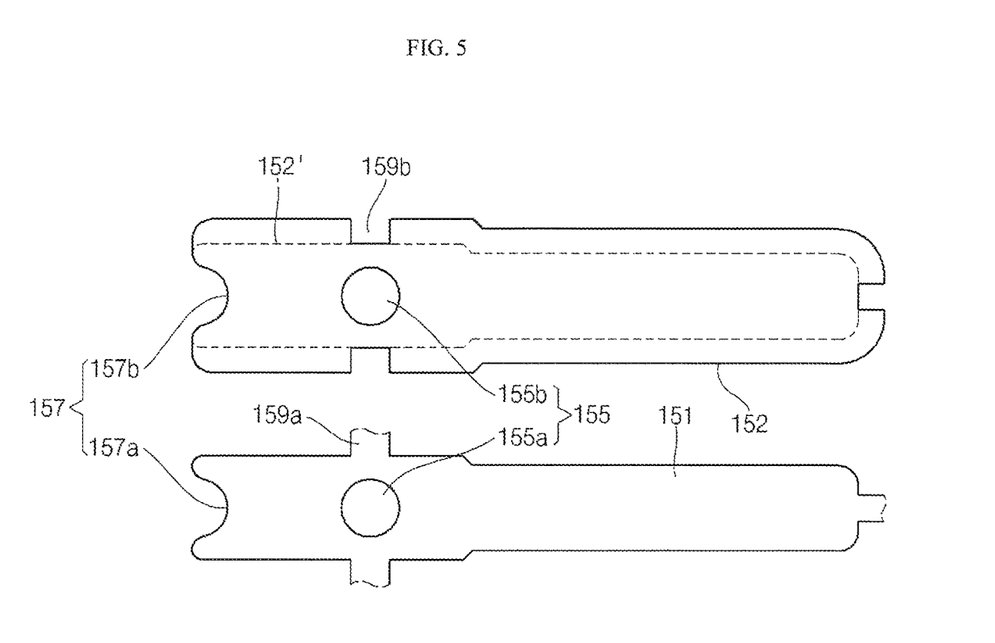
FIG. 5 is a plan view illustrating a bottom surface of a bottom plate of the secondary battery of FIG. 1 before a lamination process, according to an embodiment of the present invention.
Figure 6:
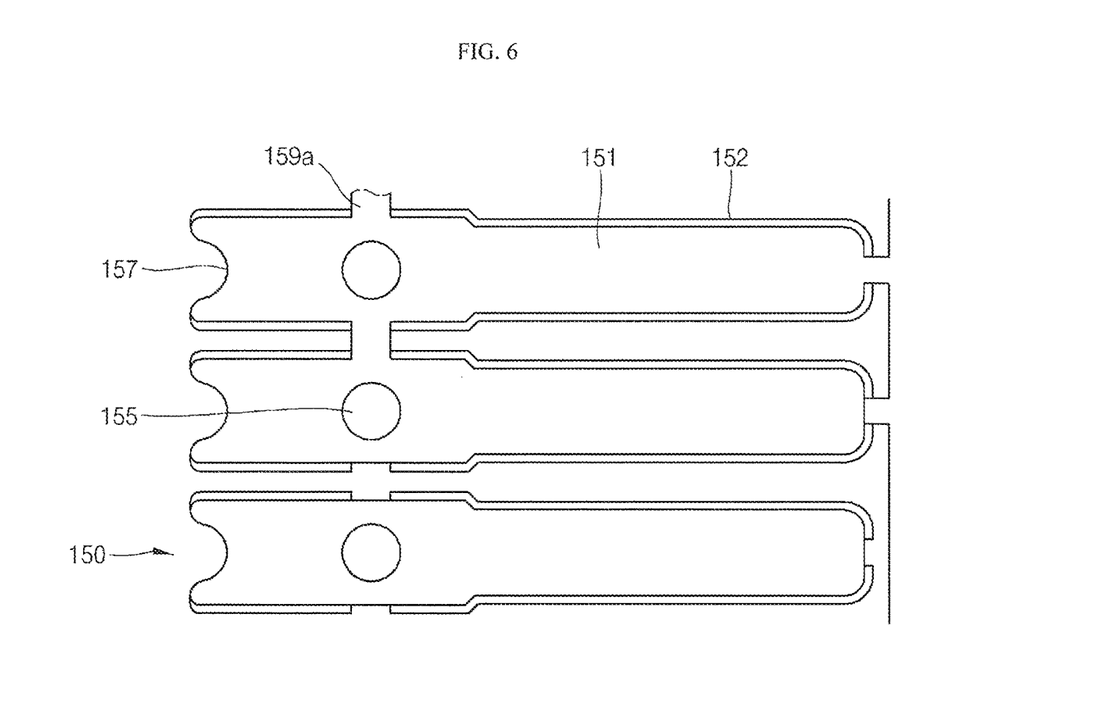
FIG. 6 is a plan view illustrating a bottom surface of the bottom plate of FIG. 5 after a lamination process.
Figure 7:
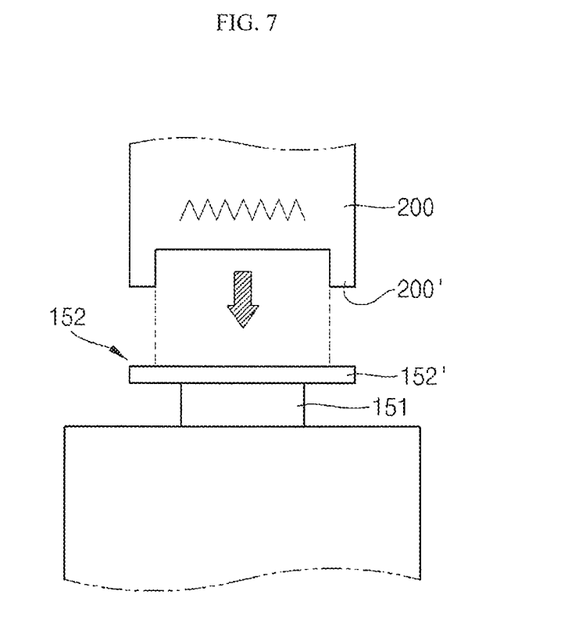
FIG. 7 schematically illustrates a lamination process of a bottom plate of a secondary battery, according to an embodiment of the present invention.

FIG. 4A is a plan view illustrating a bottom surface of the bottom plate 150, according to an embodiment of the present invention; FIG. 4B is a front view of the bottom plate 150; and FIG. 4C is a side view of the bottom plate 150. FIG. 5 is a plan view illustrating a bottom surface of the bottom plate 150 before a lamination process, according to an embodiment of the present invention; FIG. 6 is a plan view illustrating a bottom surface of the bottom plate 150 after a lamination process; and FIG. 7 schematically illustrates a lamination process of the bottom plate 150, according to an embodiment of the present invention.

Referring to FIGS. 4A to 4C, the bottom plate 150 includes the terminal plate 151, and the insulation film 152 stacked on and integrated with the terminal plate 151. In one embodiment, the insulation film 152 is formed to cover the top surface of the terminal plate 151 and most of the lateral surfaces of the terminal plate 151. Therefore, the insulation film 152 may insulate the terminal plate 151 and the cap plate 140 from each other and may insulate the terminal plate 151 and the case 120 or the first electrode tab 114 from each other.

Referring to FIGS. 5 and 6, in one embodiment, the bottom plate 150 is integrated by stacking the terminal plate 151 including the concave portion 157a formed at one side and a terminal through hole 155a, and the insulation film 152 including the concave portion 157b and a terminal through hole 155b corresponding to the concave portion 157a and the terminal through hole 155a, respectively, of the terminal plate 151. In one embodiment, the terminal plate 151 and the insulation film 152 are integrated with each other by lamination, that is, laminated together.

In one embodiment, before the stacking of the terminal plate 151 and the insulation film 152, the insulation film 152 is slightly larger than the terminal plate 151 in size so as to cover the top surface and the lateral surface of the terminal plate 151. In other words, the insulation film 152 includes a bent portion 152' covering the lateral surface of the terminal plate 151. In one embodiment, the insulation film 152 is formed such that it extends further from the top surface of the terminal plate 151 as much as a length of the lateral surface of the terminal plate 151. Since the bent portion 152' of the insulation film 152 surrounds the lateral surface of the terminal plate 151, the insulation film 152 covers the top and lateral surfaces of the terminal plate 151 with the same thickness. That is, since the terminal plate 151 is insulated by the insulation film 152 formed of a thin plate or layer, the bottom plate 150 can be fabricated having a small thickness, thereby securing an internal space of the secondary battery 100.

The terminal plate 151, in one embodiment, further includes a connecting portion 159a connecting the terminal plate 151 to another terminal plate 151 of a plurality of the terminal plates 151 and which is cut after processing of the bottom plate 150 is completed. In one embodiment, a groove 159b is formed in the insulation film 152 at a region corresponding to the connecting portion 159a. The bottom plate 150 is processed such that the plurality of terminal plates 151 are connected to each other by the connecting portion 159a, and the connecting portion 159a is cut away for applying the bottom plate 150 to the individual secondary battery 100, after the processing of the bottom plate 150 is completed. Since the groove 159b is formed at the region corresponding to the connecting portion 159a, that is, at a region (e.g., a predetermined region) of the bent portion 152' corresponding to the cut-away portion of the terminal plate 151, the cut-away region is exposed by the insulation film 152. That is, since the bent portion 152' is not formed at a region corresponding to the cut-away region, the insulation film 152 can easily wrap the lateral surface of the terminal plate 151 when the bottom plate 150 is integrated.

Referring to FIG. 7, in one embodiment, the integrating of the bottom plate 150 may be achieved by placing the insulation film 152 on the terminal plate 151 and pressing the resultant product on the insulation film 152 using a press 200 including heat wires and heating the same. In one embodiment, the bent portion 152' is bent and makes contact with the lateral surface of the terminal plate 151 by a protrusion 200' of the press 200. In one embodiment, to improve the reliability of bending, the protrusion 200' is shaped to have a shape similar to that of the bent portion 152'. In addition, since the groove 159b is formed in the bent portion 152', bending is performed on a region, except for the connecting portion 159a of the terminal plate 151. Therefore, when the insulation film 152 is pressed using the press 200, the bending of the bent portion 152' on the terminal plate 151 may be more easily achieved and adherence between the lateral surface of the terminal plate 151 and the bent portion 152' can be improved.

As described above, in the secondary battery according to embodiments of the present invention, the bottom plate 150 is formed by integrating the terminal plate 151 with the insulation film 152. The integrating of the terminal plate 151 and the insulation film 152 may be performed by lamination. Therefore, the bottom plate 150 according to embodiments of the present invention may have a fine appearance because an unnecessary gate mark in a case of injection molding is not formed. That is, in a case where injection molding is used, the gate mark is necessarily formed. While surface roughness of a region having a gate mark formed therein is different from that of a region without a gate mark formed therein, the bottom plate 150 according to an embodiment of the present invention is made by a lamination process, such that the insulation film 152 covering the top and lateral surfaces of the terminal plate 151 has the same surface roughness throughout the entire surface of the insulation film 152.

In addition, a separate element for insulating the terminal plate 151 and the cap plate 140 from each other is not provided, thereby reducing the number of elements, simplifying the assembling process, and saving cost. Further, since a separate element for insulation is not provided, it is possible to further secure an additional internal space of the secondary battery, thereby increasing a bending space and increasing the capacity of the electrode assembly 110. Alternatively, the secondary battery 100 can be manufactured having a smaller size by reducing the internal space.

While some exemplary embodiments have been disclosed herein, and although specific terms are employed, they are used and are to be interpreted in a generic and descriptive sense only and not for purposes of limitation. Accordingly, it will be understood by those of ordinary skill in the art that various changes in form and details may be made without departing from the spirit and scope of the present invention as set forth in the following claims and equivalents thereof.

What is claimed is:

1. A secondary battery comprising:
    an electrode assembly comprising a first electrode plate and a second electrode plate;
    a case accommodating the electrode assembly;
    a cap assembly comprising a cap plate coupled to the case and electrically connected to the first electrode plate, and a bottom plate attached to a bottom surface of the cap plate; and
    an electrode terminal protruding from the cap assembly and electrically connected to the second electrode plate,
    wherein the bottom plate comprises a terminal plate electrically connected to the electrode terminal, and an insulation film stacked on the terminal plate and electrically insulating the terminal plate and the cap plate from each other, the insulation film being laminated to the terminal plate,
    wherein the cap plate includes a protrusion at the bottom surface,
    wherein the terminal plate includes a top surface facing the bottom surface of the cap plate, a bottom surface opposite the top surface, a lateral surface extending from the top surface to the bottom surface of the terminal plate, and a concave portion formed in the lateral surface facing, the protrusion at an end portion of the terminal plate, the concave portion corresponding to the protrusion, wherein the concave portion is spaced apart from the protrusion such that a portion of a perimeter of the protrusion is arranged within and surrounded by the concave portion at a side of the protrusion, and wherein the insulation film covers the top surface and a portion of the lateral surface of the terminal plate such that the concave portion of the terminal plate is exposed through the insulation film.

2. The secondary battery as claimed in claim 1, wherein the bottom plate includes a terminal through hole, and the electrode terminal passes through the terminal through hole.

3. The secondary battery as claimed in claim 1, wherein the insulation film is between the cap plate and the terminal plate.

4. The secondary battery as claimed in claim 1, wherein the insulation film includes a concave portion corresponding to the concave portion of the terminal plate.

5. The secondary battery as claimed in claim 1, wherein the protrusion and the concave portion are configured to be brought into contact with each other during compression of the secondary battery to short circuit the secondary battery.

6. The secondary battery as claimed in claim 1, wherein the insulation film has a same thickness on the top surface and the lateral surface of the terminal plate.

7. The secondary battery as claimed in claim 1, wherein the terminal plate includes at least one cut-away region, and the cut-away region is exposed through the insulation film.

8. The secondary battery as claimed in claim 1, wherein the insulation film does not have a molding gate mark such that the insulation film has a same surface roughness throughout an entire outer surface of the insulation film covering the top surface and the lateral surface of the terminal plate.

9. The secondary battery as claimed in claim 1, wherein the terminal plate comprises a material selected from the group consisting of Invar, copper (Cu), aluminum (Al), and nickel (Ni).

10. The secondary battery as claimed in claim 1, wherein the insulation film comprises a material selected from the group consisting of polyethylene (PE), polypropylene (PP), polyimide (PI), polyethylene terephthalate (PET), and polycarbonate (PC).

* * * * *